(12) United States Patent
Cheng

(10) Patent No.: US 8,425,752 B2
(45) Date of Patent: Apr. 23, 2013

(54) ANODIZED ALUMINUM COOKWARE WITH EXPOSED COPPER

(75) Inventor: Stanley Kin Sui Cheng, Hillsborough, CA (US)

(73) Assignee: Meyer Intellectual Properties Limited (VG)

( * ) Notice: Subject to any disclaimer, the term of this patent is extended or adjusted under 35 U.S.C. 154(b) by 793 days.

(21) Appl. No.: 12/507,704

(22) Filed: Jul. 22, 2009

(65) Prior Publication Data

US 2011/0017603 A1  Jan. 27, 2011

(51) Int. Cl.
*C25D 11/04* (2006.01)
*C25D 11/18* (2006.01)

(52) U.S. Cl.
USPC ............ 205/121; 205/118; 205/222; 205/324

(58) Field of Classification Search ................... 205/121
See application file for complete search history.

(56) References Cited

U.S. PATENT DOCUMENTS

| 6,197,438 | B1 * | 3/2001 | Faulkner ...................... 428/627 |
| 6,267,830 | B1 * | 7/2001 | Groll ............................. 148/531 |
| D652,670 | S * | 1/2012 | Rae ................................ D7/354 |
| 2005/0205582 | A1* | 9/2005 | Cheng ......................... 220/573.3 |
| 2008/0142526 | A1* | 6/2008 | Cheng et al. ................ 220/573.1 |

\* cited by examiner

*Primary Examiner* — Harry D Wilkins, III
(74) *Attorney, Agent, or Firm* — Edward S. Sherman

(57) ABSTRACT

Anodized aluminum cookware having an exposed copper base or ring is formed by anodizing the completed vessel using a protective cap to cover most of the copper. The portion of copper that is exposed to the anodizing bath only tarnishes slightly and is preferably polished off after a protective lacquer is applied, creating a clean even margin with the anodized aluminum portion of the vessel.

9 Claims, 6 Drawing Sheets

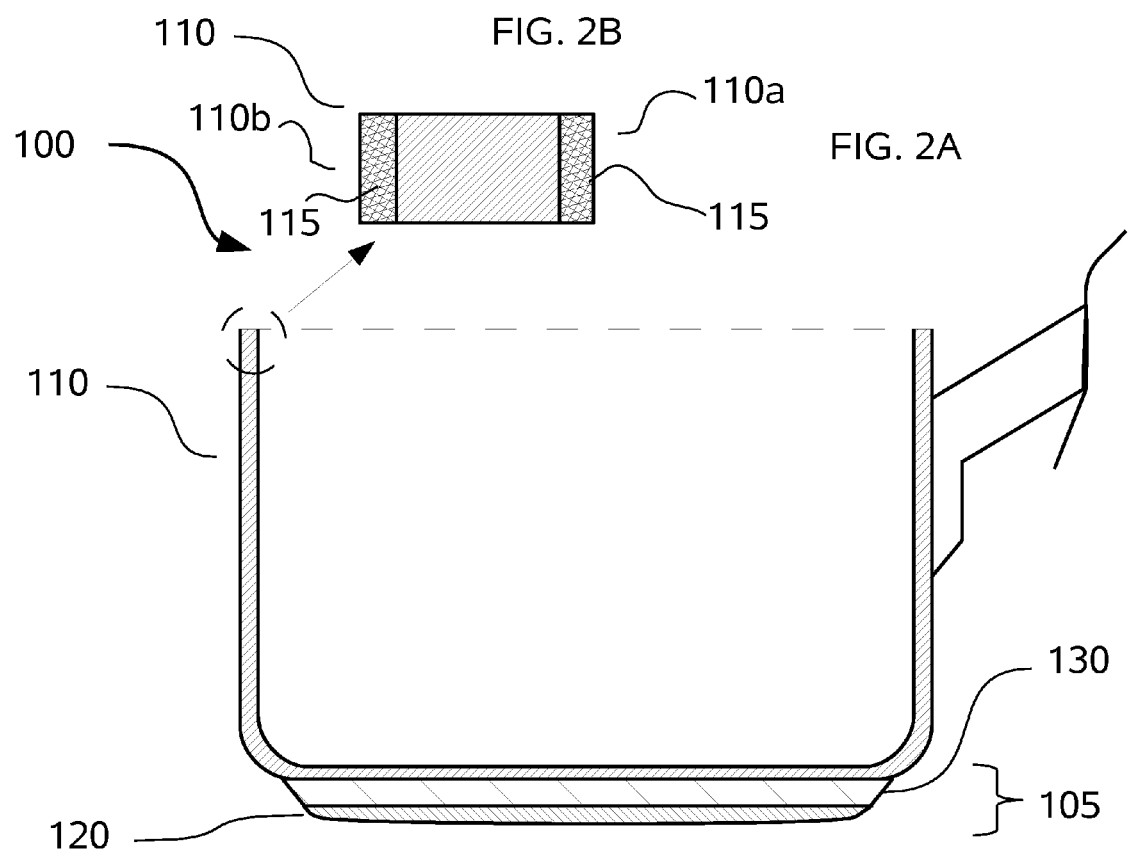

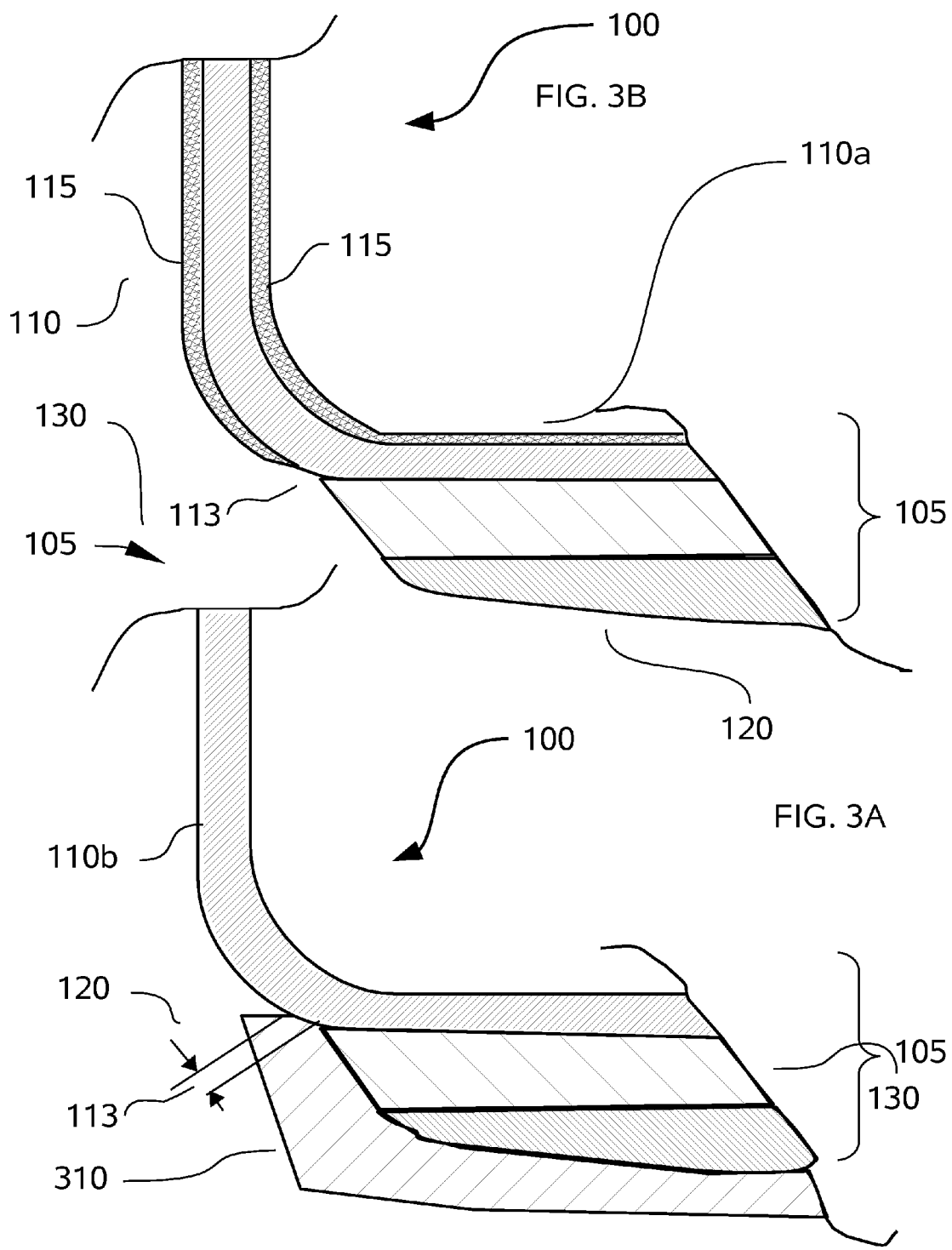

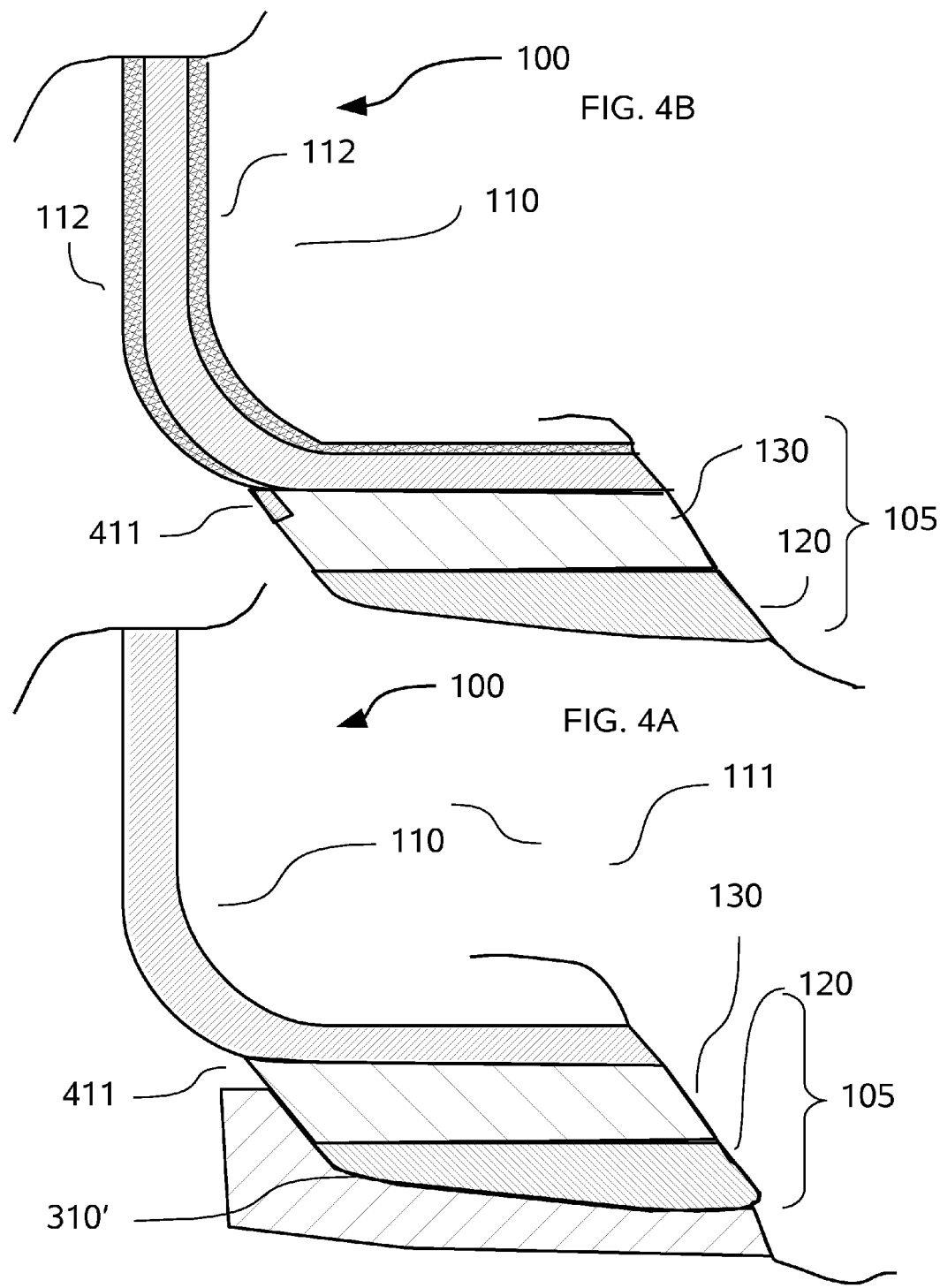

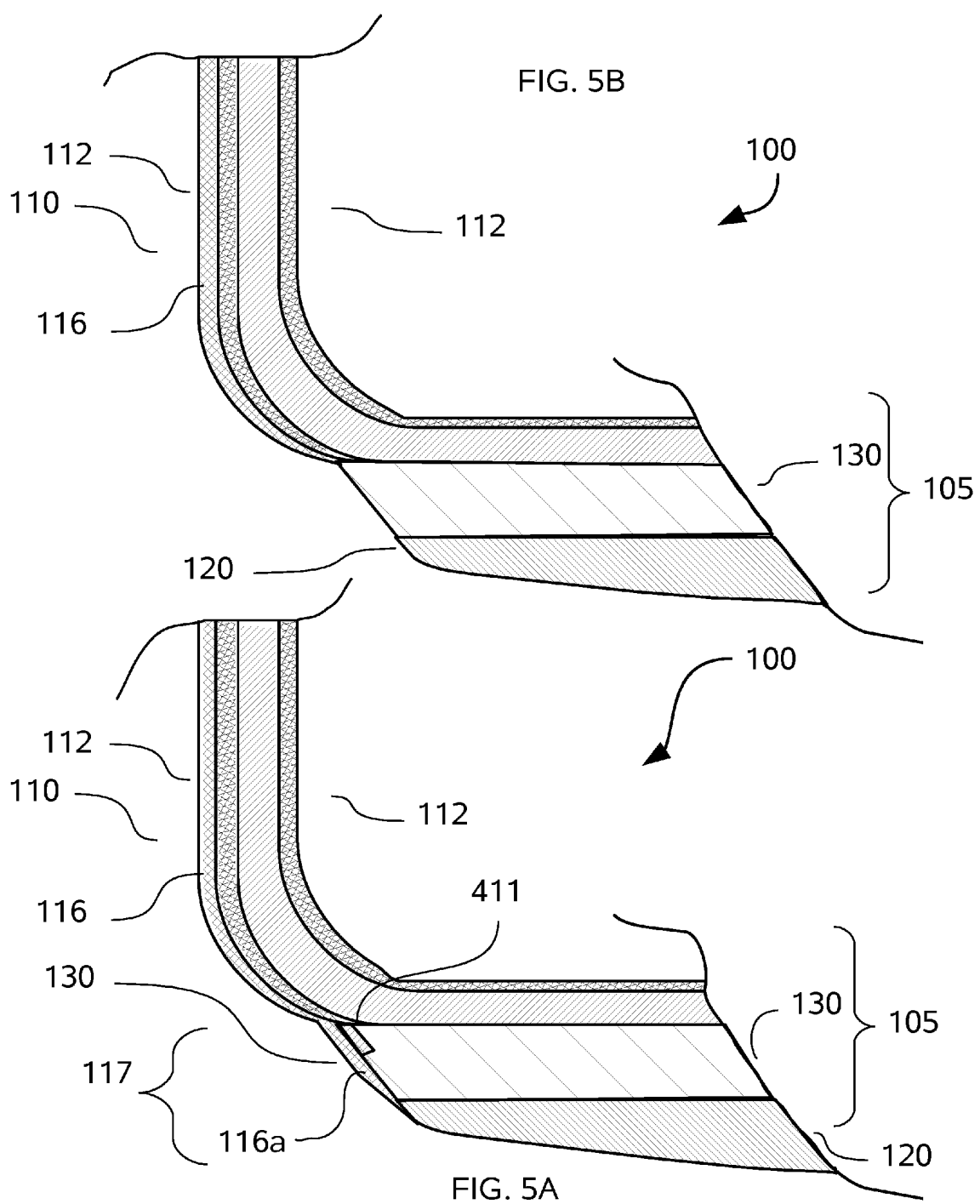

ANODIZED ALUMINUM COOKWARE WITH EXPOSED COPPER

CROSS REFERENCE TO RELATED APPLICATIONS

None

BACKGROUND OF INVENTION

The present invention relates to a method of manufacturing cookware having a decorative design.

Copper and copper clad cookware are well know. However, the copper cladding hides the beauty of copper. Some styles of copper cookware have a base that is a laminate of copper with other metal, such as aluminum and stainless steel for protection.

Exposing at least a portion of the copper core normally hidden behind cladding is desirable as a decorative effect, but also helps the cook differentiate the cookware from similar cookware that does not have a highly conductive base or sidewalls.

One such novel design, now the subject of a commonly owned U.S. design patent application no. 29/313,712 filed Feb. 3, 2009, now U.S. Design Pat. No. D652,670, is shown in FIG. 1. As disclosed further herein and not admitted as prior art, such an ornamental appearance of cookware vessel 100 can be provided by an anodized aluminum portion that forms a vessel 110 for containing fluid, which is dark grey in color and a generally matte finish. The base 105 or bottom of vessel 100 is a laminate of copper cap which is attached to the aluminum vessel body 110 followed by a protective cap of stainless steel 130 attached to the copper base or cap 130. The stainless steel cap 130 does not extend upward to the anodized aluminum, but exposes an annular rim 114 of copper metal. This construction thus produces a decorative design of a grey body, with a bright copper rim between the bright silvery stainless steel base. FIG. 2A shows the construction of the vessel 100 in cross-section, with FIG. 2B showing a magnified partial view of the cookware wall adjacent the rim thereof.

This construction is preferred for protecting the copper layer with the stainless steel cap, and the scratch resistance of the anodized alumina body, as well as the higher thermal conductivity of the copper. However, similar appearing cookware can be made using paints or finishes to provide the matte color of the alumina; or plating can be used to create the visual impression of a thick copper layer in the cap.

It is therefore a first object of the present invention to provide an improved method for fabricating a cookware article having a portion of exposed copper adjacent an anodized aluminum layer.

It is also an object of the invention to provide improved method for fabricating a cookware article having a portion of exposed copper adjacent an anodized aluminum layer wherein a steel cap protects the lower portion of the exposed copper so that only a band or ring remains visible.

It is a further object of the invention to provide such methods wherein the seams or margins between the different layers, and in particular between the copper and aluminum has a regular sharp transition along the entire periphery of the vessel, and to do so in a cost effective manufacturing process.

SUMMARY OF INVENTION

In the present invention, the first object is achieved by a process for fabricating anodized cookware comprising the steps of providing a cooking vessel having an exposed aluminum upper portion and an exposed copper lower portion, attaching a protective cap to cover substantially all of the exposed copper portion without covering the exposed aluminum portion, immersing the vessel in an anodizing bath, applying electrical current to the vessel to anodize the exposed aluminum portion thereof creating an alumina coating thereon, wherein the exposed portion of the copper not covered by said cap remains intact, having formed thereon a thin layer of copper oxides.

The above and other objects, effects, features, and advantages of the present invention will become more apparent from the following description of the embodiments thereof taken in conjunction with the accompanying drawings.

BRIEF DESCRIPTION OF DRAWINGS

FIG. 2A is a cross-sectional elevation of the vessel of FIG. 1. FIG. 2B is a cross-sectional elevation of the portion of the vessel indicated in FIG. 2A.

FIG. 3A is a cross-sectional elevation of just a portion of the base of the vessel in FIGS. 1 and 2 to show a first embodiment for a masking boot and a method of anodizing and finishing the vessel.

FIG. 3B is cross sectional elevation of the vessel in FIG. 3A after anodizing.

FIG. 4A is a cross-sectional elevation of just a portion of the base of the vessel in FIGS. 1 and 2 to show a preferred deployment of the masking boot.

FIG. 4B is a cross sectional elevation of the vessel in FIG. 3A after anodizing.

FIG. 5A is a cross sectional elevation of FIG. 4B after coating with a protective organic finish.

FIG. 5B is a cross sectional elevation of FIG. 5A after polishing the base.

DETAILED DESCRIPTION

Figure 1:
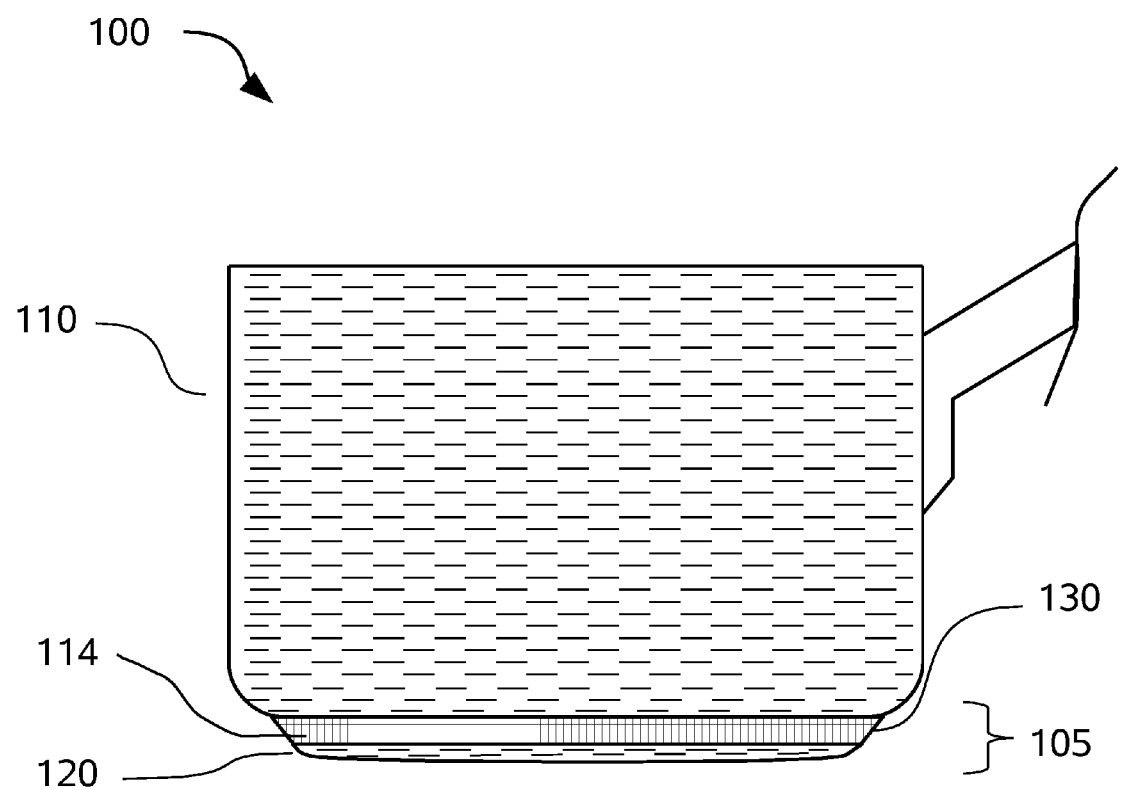
FIG. 1 is an exterior elevation of cooking vessel having a decorative color pattern formed from the sidewall and the dual layer base of copper and stainless steel.

Referring to FIGS. 1 through 5, wherein like reference numerals refer to like components in the various views, there is illustrated therein a new and improved Anodized Aluminum Cookware with Exposed Copper, generally denominated 100 herein.

One method of creating a cookware vessel with the appearance shown in FIG. 1 and FIG. 2 is to anodize the vessel 100 after attachment of a copper base or cap layer 130, as well as a final stainless steel cap 120 to the bottom of the aluminum vessel 110. This leaves the interior of the vessel 110a and the exterior portion 110b above the copper layer 130 with an exterior of alumina or an aluminum oxide coating 115, which has a matte grey color However, as the anodizing treatment occurs by passing current through the vessel in a hot concentrated sulfuring acid solution, the none aluminum portions of the vessel, i.e. the copper and stainless steel, should be masked to avoid their undesirable and extensive corrosion in this media. While the masking can be painted on the stainless steel cap 120 and exposed ring of the copper base 130 very precisely, this is time consuming.

Figure 3C:
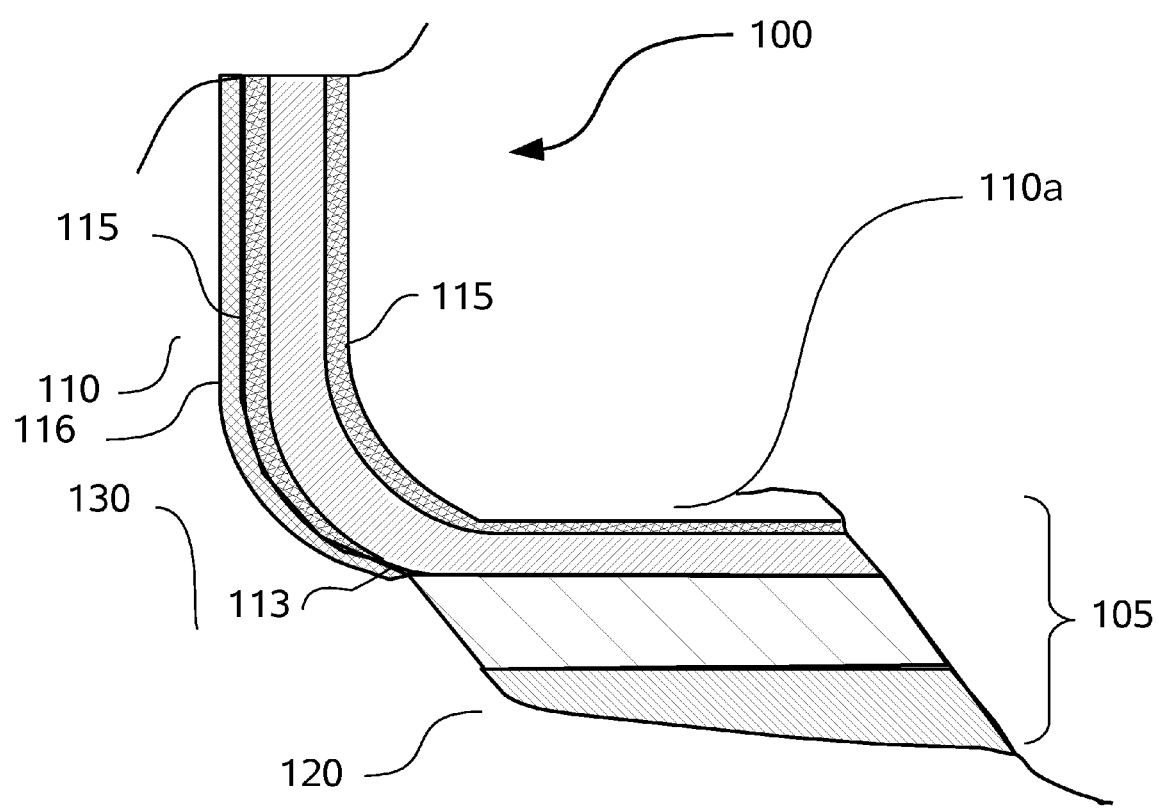
FIG. 3C is a cross sectional elevation of the vessel in FIG. 3B after applying protective lacquers or finishes on the entire outer surface to hide the un-anodized layer.

It is far easier to cover the base with a conforming rubber base or boot 310 as shown in FIG. 3A. As any misalignment in the boot or, variations in manufacture of either the boot 310 or the article 100, might leave some portion of the base exposed, the boot can be slightly oversized to cover a small extra portion 113 of the aluminum. This produces a portion of the aluminum 113 that is not anodized, which in contrast to anodized coating on the exterior 112, would thus stand out, being a highly reflective metal. Fortunately protective lacquers or finishes can be applied to the entire outer surface to hide this imperfection, the result of which is shown in FIG. 3C. However the precise application of this material 116, to avoid covering the copper 130, can also be time consuming. However, such a coating 116 is still preferred as it offers other benefits, as for example when it incorporates silicones, fluorocarbon polymers and the like provide a relatively heat resistant non-stick finish. Examples of such coatings include organic materials that may comprise of other polymers and resins, as well as inorganic pigmenting agents, filler and reinforcing agents such as described in U.S. Pat. Nos. 5,250,356 and 5,194,336 as well as combined inorganic—organic coatings systems as disclosed in U.S. Pat. No. 7,244,502, all of which are incorporated herein by reference. The fillers in the coating 116 can give an appearance comparable to anodized aluminum, or alternatively create a different decorative finish if desired. It should be appreciated that a different non-stick finish 116 can be used in the interior of 110a of the vessel 100, which can include multiple layers to increase durability.

An improved masking means has been discovered to avoid leaving this region 113 of un-anodized aluminum adjacent the copper band 114. Rather than trying to cover the entire copper base 130 that appears externally as a circumferential band 114, it is beneficial to provide as shown in FIG. 4A, a protective boot 310' that is sized just smaller than the nominal combined thickness of the copper 130 and stainless steel 120 bases, leaving only a small portion 401 of the copper exposed.

It has been surprisingly discovered that the conventional anodizing bath does not as aggressively attack the copper 130 when only a small portion 401 is exposed, and that the oxidation that does occur is easily removed in the final polishing step of the stainless steel 120 and copper base 130.

This is remarkable in light of the observations that if the entire copper base 130 is exposed it will be completed corroded, usually delaminating the bond with the aluminum portion 110 and allowing attack into the stainless steel cap 120 from what was the copper interface therewith.

Not wishing to be bound by theory, it is believed that this remarkable reduction in oxidation of the copper occurs uniquely in this configuration because the heat of oxidation is quickly removed by conduction through the unexposed copper so that the reaction never auto accelerates from the heat that is generated. In other words, when the entire copper base is exposed to an anodizing condition, the rate of oxidation of bulk copper is auto-catalytically accelerated due to the heat of reacting and thus increasing the reaction rate. However, when just a small amount of copper is exposed, the heat of reaction is removed by the copper bulk such that the reaction rate remains low and never accelerates. Thus, the aluminum surfaces 110a and 110b are oxidized at a faster rate to produce the protective alumina coating 115 that is durable, while producing only a very thin superficial layer of copper oxides 411 on the exposed rim or exterior 114 of the copper base 130.

Whatever method is used to mask the copper and stainless steel bases, it is preferable to cover at least the anodized aluminum with the exterior protective lacquer 116, as well as a similar non-stick coating on the interior, as shown in FIGS. 3C and 5B.

In a further preferred embodiment of the invention, illustrated in FIGS. 5A and 5B, the exterior protective lacquers 116 is applied to the entire exterior of the vessel, without concern that portion of the stainless steel cap 120 and copper base or band 130 are covered (FIG. 5A). Next the base 117 of the vessel 110 is polished to remove the portion 116a that cover the copper band 130 and steel cap 120. This polishing step also removes the thin strip of copper oxides or tarnish 411, resulting in the completed vessel 100 shown in FIG. 5B.

Other embodiments of the invention include an anodized aluminum vessel with a copper cap, or other exposed copper portions and do not necessarily require a steel cap 120.

While the invention has been described in connection with several preferred embodiments, it is not intended to limit the scope of the invention to the particular form set forth. On the contrary, it is intended to cover such alternatives, modifications, and equivalents as may be within the spirit and scope of the invention as defined by the appended claims.

The invention claimed is:

1. A process for fabricating anodized cookware, the process comprising the steps of:
   a) providing a cooking vessel having an exposed aluminum upper portion and an exposed copper lower portion,
   b) attaching a protective cap to cover a major portion of the exposed copper portion without covering the exposed aluminum portion, wherein a minor portion of the exposed copper remains exposed after said step of attaching the protective cap,
   c) immersing the vessel in an anodizing bath,
   d) applying electrical current to the vessel to anodize the exposed aluminum portion thereof creating an alumina coating thereon,
   e) wherein the minor portion of the copper not covered by said cap remains intact, having formed thereon a thin layer of copper oxides in said step of immersing and applying electrical current.

2. The process of claim 1 further comprising the step of polishing away the thin layer of copper oxides.

3. The process of claim 1 further comprising the step applying a protective lacquer coating over at least the alumina coating on the exterior portion of the vessel.

4. The process of claim 3 further comprising the step of polishing away the thin layer of copper oxides after it is covered with the protective lacquer.

5. The process of claim 1 wherein the vessel has a bottom cap portion of stainless steel that partially covers an inner copper cap in thermal communication with the aluminum vessel to reveal the exposed copper lower portion.

6. A process for fabricating anodized cookware, the process comprising the steps of:
   a) providing a cooking vessel having a plurality of exposed aluminum portions and a thin exposed copper portion adjacent to at least one of the aluminum portions,
   c) immersing the vessel in an anodizing bath,
   d) applying electrical current to the vessel to anodize the exposed aluminum portions thereof creating an alumina coating thereon, wherein the thin exposed copper portion remains intact, having formed thereon a thin layer of copper oxides,
   e) polishing away the thin layer of copper oxides off of the thin exposed copper portion to expose bright copper metal there under,
   f) wherein a portion of the plurality of exposed aluminum portions retain the anodized finish after the step of polishing away the thin layer of copper oxides.

7. A process for fabricating anodized cookware, the process comprising the steps of;
   a) providing a cooking vessel having an exposed aluminum upper sidewall portion and a bottom below the exposed aluminum upper sidewall portion, the bottom comprising an exposed copper annular portion and a stainless steel base below the exposed copper annular portion, b) covering all of the stainless steel base and at least the adjacent portion of the exposed copper annular portion with a protective member, wherein there remains at least a narrow exposed copper annular portion adjacent to the exposed aluminum upper sidewall portion, c) immersing the vessel in an anodizing bath, d) applying electrical current to the vessel to anodize the exposed aluminum upper sidewall portion thereof creating an alumina coating thereon, wherein the narrow exposed copper annular portion not covered by the protective member remains intact, having formed thereon a thin layer of copper oxides, e) polishing away the thin layer of copper oxides formed on the narrow exposed copper annular portion to reveal bright reflective copper on at least the narrow exposed copper annular portion.

8. The process of claim 7 wherein the protective member is at least one of a protective lacquer coating and a conforming rubber boot.

9. The process of claim 7 further comprising the step applying a protective lacquer coating over at least the anodized exterior portion of the vessel after said steps of anodizing and polishing.

* * * * *